Sept. 11, 1951     L. O. GREELEY     2,567,428
AIR VALVE FOR PRESSURE GAUGES
Filed March 5, 1945     2 Sheets-Sheet 1

Inventor
Leo O. Greeley
By Liverance & Van Antwerp
Attorneys

Sept. 11, 1951 L. O. GREELEY 2,567,428
AIR VALVE FOR PRESSURE GAUGES
Filed March 5, 1945 2 Sheets-Sheet 2

Inventor
Leo O. Greeley
By Liverance and
Van Antwerp
Attorneys

Patented Sept. 11, 1951

2,567,428

UNITED STATES PATENT OFFICE 2,567,428

AIR VALVE FOR PRESSURE GAUGES

Leo O. Greeley, Cadillac, Mich., assignor to General Sales Company of Cadillac, Cadillac, Mich., a limited partnership of Michigan Application March 5, 1945, Serial No. 581,148

2 Claims. (Cl. 251—87)

This invention relates to a valve construction which is particularly useful in connection with controlling the direction of fluid pressure to one end or the other of a cylinder of a piston which is to be actuated by the pressure, and in connection with which pressure gauges are provided to show the degrees of pressure at the supply source for the pressure, and also to show the working pressure upon the piston within the cylinder at either end thereof, one gauge being for recording the pressure of the fluid supply source and the other that in the cylinder, irrespective of whether said pressure is at either end thereof.

For purposes of illustration and description of one field of use for the valve which I have developed, it is disclosed in conjunction with the operation of the road engaging scraper blade on a scraper, connected to and located underneath the chassis of a truck. The fluid pressure is entered into one end of a cylinder which is connected with a rockably mounted scraper blade to force the blade into working engagement with the road surface. The pressure which is supplied is indicated on a gauge under such circumstances and may be maintained at a desired amount, should there be a leakage or reduction of pressure for any other cause, by a proper operation of the valve to supply further and additional pressure if it becomes too low. For raising the road scraper blade from the road and holding it in elevated position, the fluid pressure is directed to the opposite end of the cylinder and, of course, as great a pressure is not required merely to hold the blade in elevated position as when it is held against the road surface; still, a sufficient pressure must be used that the blade will not be inadvertently lowered partly or wholly. The same gauge which gives information as to pressure when the blade is engaged against the road surface, supplies the indicia of pressure when the blade is lifted, and which pressure can be maintained against leakage or other losses, when the gauge shows a lowering below what is required, by the proper operation of the valve to introduce additional fluid pressure for the purpose.

It is of course to be understood that when the pressure is introduced into either end of the cylinder the valve is moved to provide a continuous passage for the movement of the fluid pressure from the source thereof to the cylinder, which passage is maintained open until the desired pressure has been reached, and then the valve is operated to close such passage and is held closed as long as a required pressure is maintained. Such valve also, maintains open a passage for the exhaust of the pressure which has been previously entered at an end of the cylinder when it is reversed and supplied at the opposite end.

It is an object and purpose of the present invention to provide a simple, compact, sturdy and very effective valve for the purposes stated. An understanding of the invention and of a preferred construction embodying it may be had from the following description taken in connection with the accompanying drawings, in which, Fig. 1 is a central longitudinal section through the valve of my invention.

Like reference characters refer to like parts in the different figures of the drawing.

Figure 5:
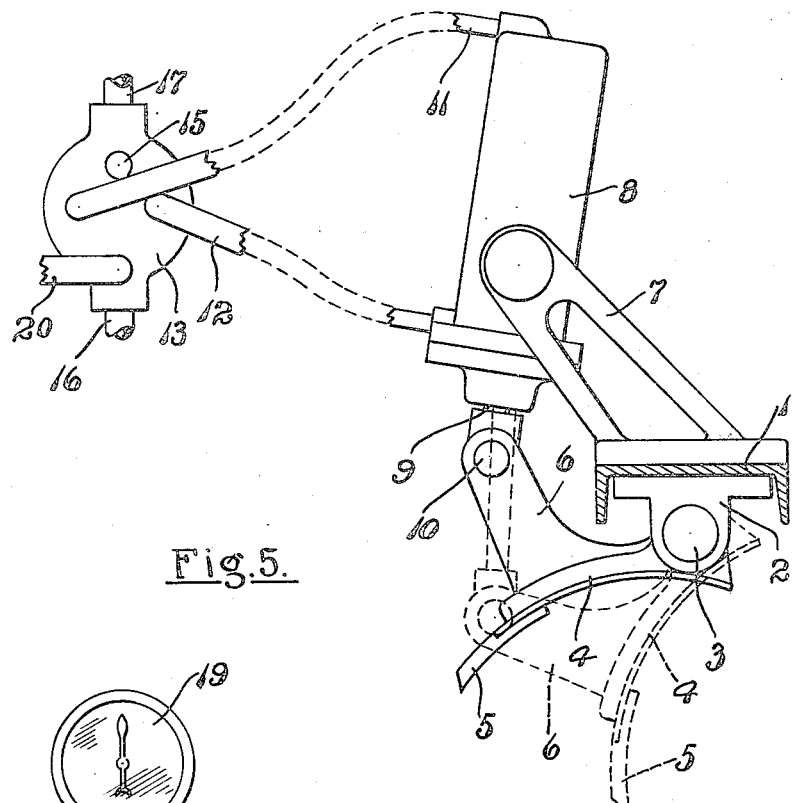
Fig. 5 is a partial section and elevation showing one place of use of the valve structure of my invention in conjunction with the raising and lowering of a road scraper blade.

Fig. 5 shows a transverse supporting beam 1 of the type which is located horizontally below and permanently secured to the side chassis frame members of a motor truck, to which suitable brackets 2 are secured at its under side, carrying a substantially horizontal rock shaft 3 on which a scraper blade structure including the parts 4 and 5, the latter being the immediate road engaging blade, is mounted for rocking movement. From the scraper blade structure an arm 6 extends upwardly. On supporting brackets 7 carried by the beam 1 a cylinder 8 is mounted on trunnions, having a piston therewithin (not shown) from which a piston rod 9 extends at its lower end and is pivotally connected at 10 to the arms 6. Fluid pressure may be supplied selectively to either the upper end of the cylinder 8, through the flexible conduit 11 or to the lower end thereof through the similar hose connection or conduit 12.

This road scraper construction as described is not new and need not be further detailed. The valve which is the subject matter of the present invention, for one of its places of use has been applied to control and direct requisite fluid pressure directly and to either end of the cylinder, and such road scraper structure is illustrated as an example of one environment in which the valve of my invention may be used and applied, without restricting such novel valve construction to the one place of use disclosed.

Figure 7:
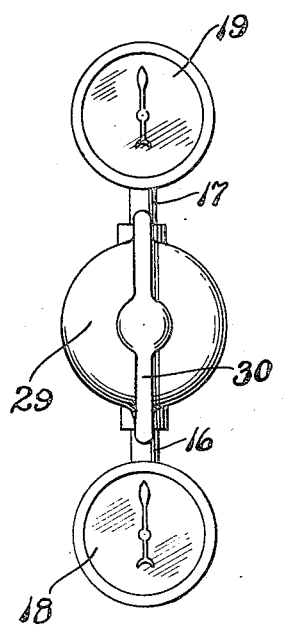
Fig. 7 is an end elevation of the valve and an elevation of the pressure indicating gauges connected therewith.

The valve includes a valve housing having a heavy and thick base 13 with a transverse inlet passage at 14 and an outlet or exhaust outlet at 15, with passage connections for the flow of pressure through a selected conduit 11 or 12. At the inner end of the passages or connections 11 and 12 and the outlet 15 arcuate recesses 11a, 12a and 15a are formed at the inner side of the base, substantially concentric with the center of said base. Lower and upper short pipes or nipples 16 and 17 are connected with the opposite lower and upper sides of the base, the pipe 16 being in connection with the inlet at 14. Lower and upper indicating gauges 18 and 19 are connected with the pipes 16 and 17, respectively (Fig. 7). The fluid pressure from the source thereof is carried by a pipe 20 connected at the inlet opening 14 and, therefore, the lower gauge 18 at all times is influenced by the supply source and indicates the pressure which it has, so that when it falls below a predetermined desired amount it should be replenished.

Figure 1:
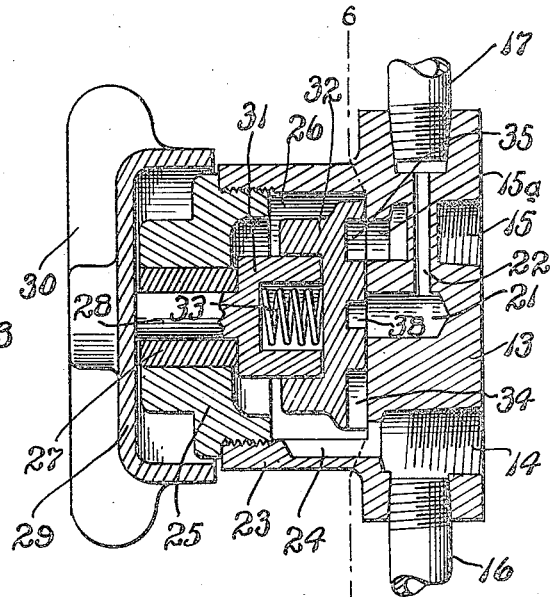

At the center of the base and at its inner side a hole 21 is made partly through the base from which a passage, indicated at 22, leads laterally to the pipe 17. Consequently the gauge 19 records whatever may be the fluid pressure which is conducted through the passages 21 and 22 to it. The valve housing is completed by a cylindrical wall 23 extending from the base, open at its free end and interiorly threaded (Fig. 1). The wall is machined or otherwise provided with a passage at 24 leading from the inlet opening at 14 to the interior of the valve housing, which is closed at its free end by a flanged exteriorly threaded closure plug 25, providing an enclosed sealed chamber 26 into which the fluid pressure is carried from the supply pipe 20.

The closure plug 25 has an axial bearing bushing 27 through it, in which a short shaft 28 is mounted for rotation. At its outer end beyond the closure plug it has a combined covering cap 29 and hand engaging wings 30 permanently secured for manual turning of the shaft 28, at its inner end. Within the chamber 26, shaft 28 is enlarged to provide a head 31 having an annular shoulder bearing against the bushing 27, and said head is inserted into a side of the valve 32 keyed or otherwise connected to the head to turn therewith. A coiled compression spring 33 is located in a cylindrical recess made in the head 31 and bears against the valve 32 pressing it against the inner side of the base 13 of the valve housing, and pressing the head 31 against the inner end of the bushing 27 to seal against escape and loss of pressure.

Figure 6:
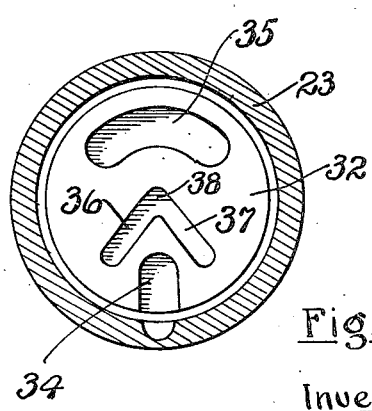
Fig. 6 is a vertical section substantially on the plane of line 6—6 of Fig. 1 looking toward the left.

At the side of the valve 32 seated against the base 13, a plurality of grooves or recesses are formed. At one side and extending radially a recess 34 is provided (Fig. 6) open at its outer end and in communication with the chamber 26. Diametrically opposite and adjacent the other side of the valve 32, an arcuate elongated groove 35 with closed ends is made. Between the two, a groove having branches 36 and 37 located at an angle to each other approximating a right angle, join at their meeting ends at 38 at the center of the bearing face of the valve and in direct conjunction with the opening 21 in the base 13.

Figure 2:
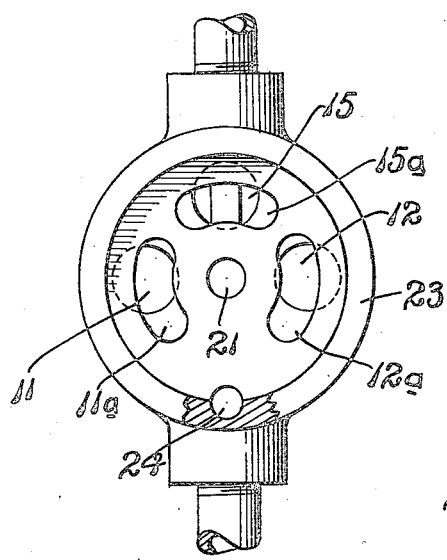
Fig. 2 is an elevation of the valve housing, all other parts of the valve structure being removed therefrom.
Figure 3:
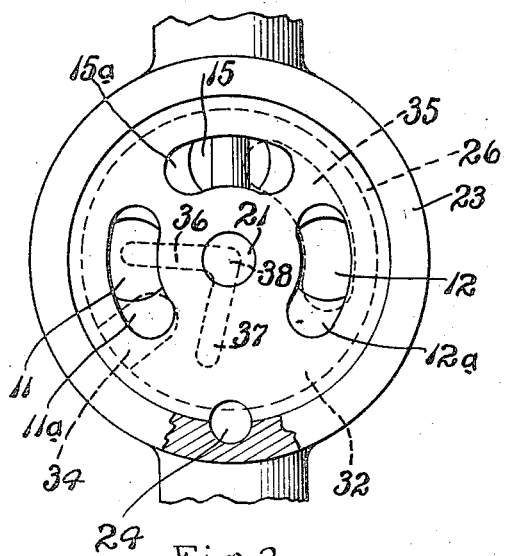
Fig. 3 is a view like Fig. 2, somewhat enlarged with a dotted line indication of the movable valve housed within said housing, at one of its positions that it occupies when fluid pressure is to be carried to one end of a cylinder.
Figure 4:
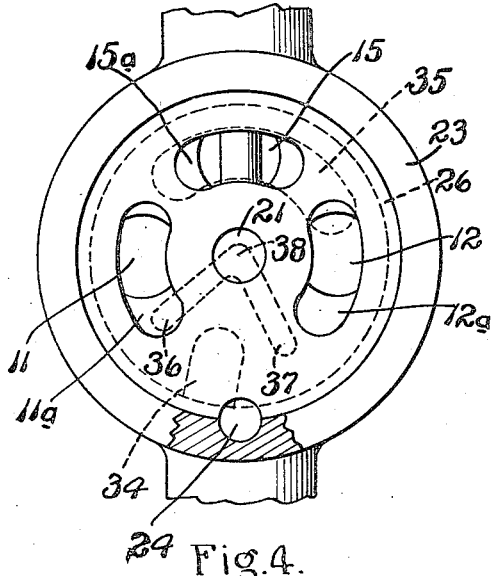
Fig. 4 is a view like Fig. 3 with the valve moved to cut off or obstruct the passage of fluid pressure, after having occupied the position shown in Fig. 3.

The fluid under pressure carried through the pipe 20 and to the chamber 26 and thence into the passage provided by the radial recess at 34 may be conducted, for example, to and through the upper conduit 11 leading to the top of cylinder 8 by turning the valve 32 to the position indicated in dotted lines in Fig. 3, with the inner end of the recess at 34 in conjunction with an end of the recess at 11a, whereupon the pressure fluid is free to flow through the conduit to the upper end of the cylinder 8. At the same time when such turning is taking place, the arm 36 of the angle groove described, at its closed end portion is brought into conjunction with the recess 11a, and the pressure fluid will follow the groove at 36 to, and thence through, the opening at 21 and the passage 22 through pipe 17 to the indicating gauge 19. The flow of the fluid is continued until the piston is moved sufficiently downward in the cylinder 8 that the immediate road engaging part 5 comes to the road, and being stopped thereby the pressure built up. When the gauge at 19 indicates the preselected desired pressure for the blade to engage the road, the valve 32 is then turned to a position such as indicated in Fig. 4, in dotted lines. In such position the recess at 34 is moved out of conjunction with the recess passage 11a, and the pressure fluid is cut off from the conduit 11. However, the arm 36 remains in connective conjunction with the recess 11a so that the pressure in the cylinder 8 is always recorded on the gauge 19. Should the escape of fluid or any other reason cause a lowering of pressure in the cylinder 8 during operation of the scraper, it is necessary merely to turn the valve back to the first position disclosed as shown in Fig. 2 until resupplied.

Of course with the movement of the piston in the cylinder 8 from the upper toward the lower end of the cylinder, the fluid below the piston must be disposed of through the conduit 12. With the valve as in Fig. 3, the arcuate recess 35 at its ends overlaps the recesses at 15a and 12a, forming a communicating passage for the pressure fluid to flow through the conduit 12 thence through the passage provided at 35 and out at the exhaust opening at 15.

On reversal of the movement of the piston in cylinder 8 to lift the scraper blade, the pressure fluid is conducted through the conduit 12 to the lower end of the cylinder to elevate the piston. To accomplish this the valve is turned from the dotted line position shown in Fig. 4 counterclockwise until the radial recess 34 reaches the end of the recess at 12a, and the arm 37 is likewise connected therewith, while the arcuate recess at 35 joins the upper conduit 11a with the exhaust opening 15. This reverses the flow of pressure fluid which will pass through the recesses 34 and 12a to the conduit 12, the exhaust from the upper end of the cylinder being carried out through the conduit 11a and the passage provided by the arcuate recess 35 to the exhaust outlet 15. At the same time a part of the pressure fluid will follow the arm 37 of the angularly disposed recess to the opening 21 thence through the passage 22 and then to the indicating gauge 19. When the gauge shows a sufficient pressure to maintain the scraper blade in elevated position, the valve will be turned back to break the connection of recesses 34 and 12a, shutting off further supply of fluid, but the arm 37 of the angular recess will still be in conjunction with the conduit 12 to thus continuously indicate it on the recording gauge 19 the pressure which is holding the scraper blade in elevated position.

The construction described is simple, very practical and sturdy and is easily manufactured and assembled at low cost. There are of course many other useful relations in which it can be used, other than in connection with road scrapers. The invention is directed to the valve structure. The claims appended hereto define the invention which is to be considered comprehensive of all forms of structure coming within their scope.

I claim:

1. A valve comprising a body having a chamber and a valve seat therein, means for admitting fluid under pressure to said chamber, two spaced outlet ports and a gauge port in said valve seat, a valve movably mounted in engagement with said valve seat, a supply passage in said valve in communication with said chamber and movable into or out of communication with either of said outlet ports and to a closed position between them, and a gauge passage in said valve shaped and positioned to communicate between said gauge port and only the outlet port with which the supply passage is in communication.

2. A valve comprising a body having a chamber and a valve seat therein, means for admitting fluid under pressure to said chamber, two spaced outlet ports and a gauge port in said valve seat, a valve movably mounted in engagement with said valve seat, a supply passage in said valve in communication with said chamber and movable into or out of communication with either of said outlet ports and to a closed position between them, and a gauge passage in said valve shaped and positioned to communicate between said gauge port and only the outlet port with which the supply passage is in communication and also to continue said communication with the outlet port last in communication with the supply passage when the supply passage is moved out of communication with either of said outlet ports.

LEO O. GREELEY.

REFERENCES CITED

The following references are of record in the file of this patent:

UNITED STATES PATENTS

| Number | Name | Date |
| --- | --- | --- |
| 885,145 | Davis | Apr. 21, 1908 |
| 954,401 | Steedman | Apr. 5, 1910 |
| 1,198,216 | Hanson | Sept. 12, 1916 |
| 1,801,441 | McKee | Apr. 21, 1931 |
| 1,971,187 | Jacobson | Aug. 21, 1934 |
| 2,042,186 | Peterson | May 6, 1936 |
| 2,103,984 | Indge | Dec. 28, 1937 |
| 2,107,114 | Gogan | Feb. 1, 1938 |
| 2,233,192 | Armington | Feb. 25, 1941 |
| 2,313,149 | Jacobsson | Mar. 9, 1943 |
| 2,344,913 | Ager | Mar. 21, 1944 |
| 2,372,606 | Sammis | Mar. 27, 1945 |